2 Sheets—Sheet 1
T. M. FLENNIKEN.
Harvester Gearing.
No. 229,993. Patented July 13, 1880.
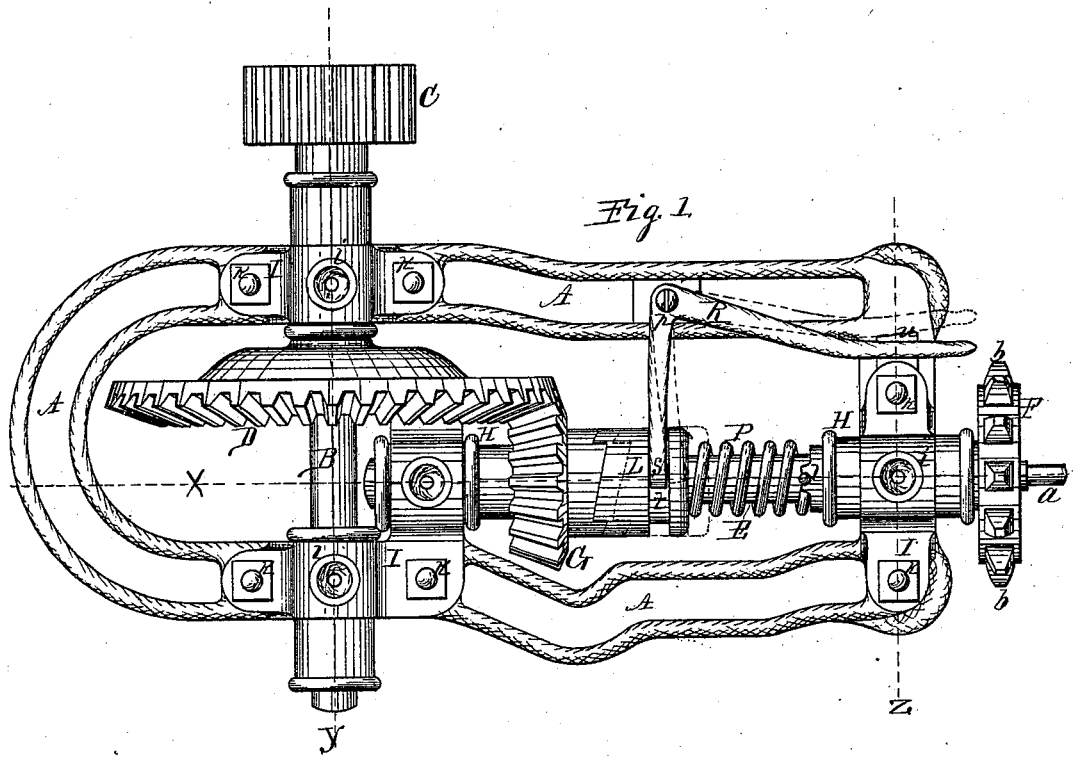
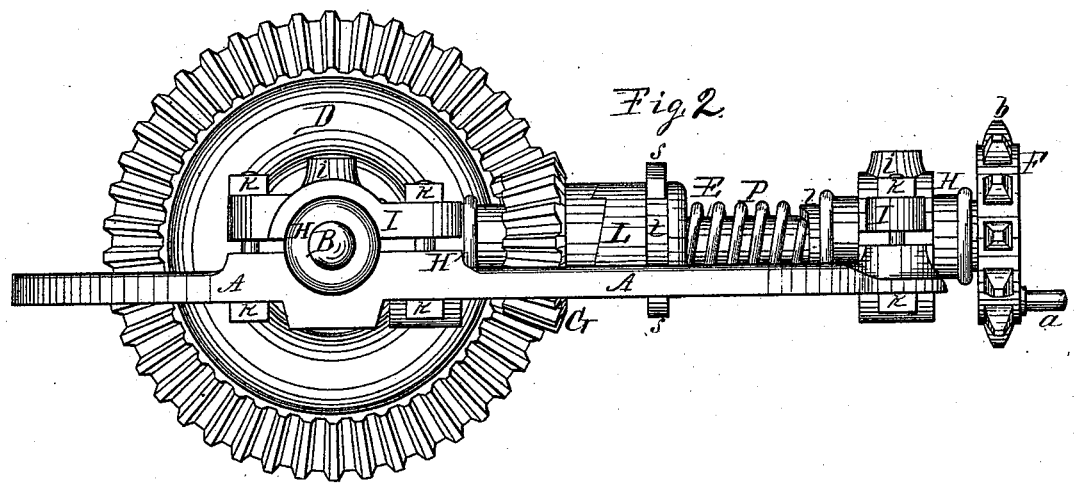
Witnesses,
C. E. Sovereign
A. O. Behel
Inventor:
Theodore M. Flenniken
Per Jacob Behel.
Atty.
N. PETERS, PHOTO-LITHOGRAPHER, WASHINGTON, D. C.

2 Sheets—Sheet 2.

T. M. FLENNIKEN.
Harvester Gearing.

No. 229,993. Patented July 13, 1880.

Witnesses.
C. E. Sovereign
A. O. Behel

Inventor.
Theodore M. Flenniken
Per Jacob Behel
Atty.

N. PETERS, PHOTO-LITHOGRAPHER, WASHINGTON, D. C.

UNITED STATES PATENT OFFICE.

THEODORE M. FLENNIKEN, OF ROCKFORD, ILL., ASSIGNOR TO HELEN M. GORHAM, EXECUTRIX, AND NORMAN C. THOMPSON, OF SAME PLACE.

HARVESTER-GEARING.

SPECIFICATION forming part of Letters Patent No. 229,993, dated July 13, 1880.

Application filed October 30, 1879.

*To all whom it may concern:*

Be it known that I, THEODORE M. FLENNIKEN, of the city of Rockford, in the county of Winnebago and State of Illinois, have invented a new and useful Improvement in Harvester-Gearing, of which the following is a specification.

This invention relates to the gear-train employed in harvesting-machines to transmit motion from the driving or ground wheel to the sickle, reel, or other moving parts of a harvester or binding-machine.

The object of this invention is to provide a ready means of mounting the shafts of a gear-train on a gear-frame to insure the perfect alignment of the shafts in their bearings, and in which the shafts and the bearings will adapt themselves to the winding, warping, and springing of the frame to preserve the alignment of the shafts in their bearings to prevent cramping or cutting of the parts.

To this end I have designed, constructed, and combined the several parts represented in the accompanying drawings, in which—

Figure 3:
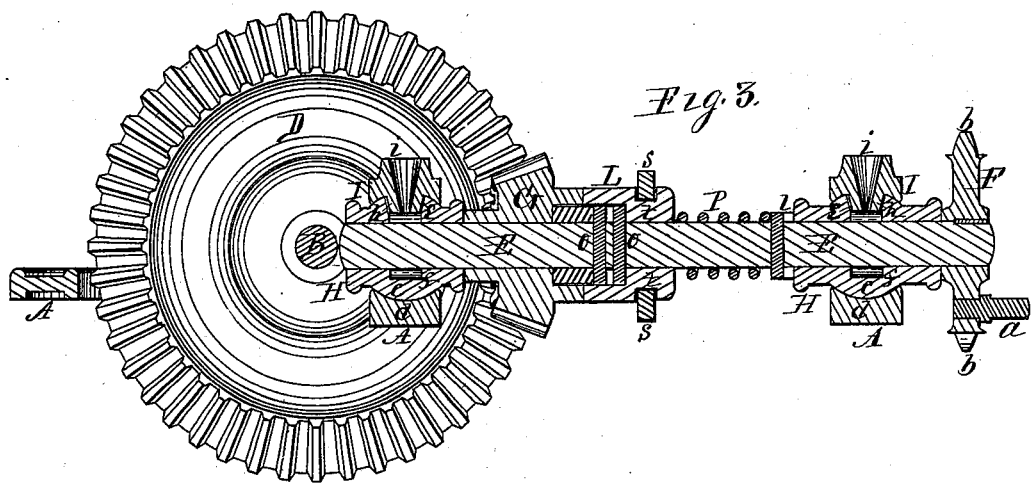
Figure 4:
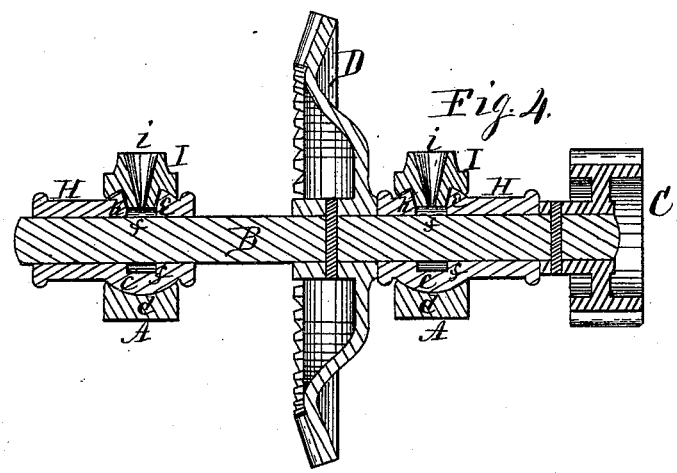
Figure 5:
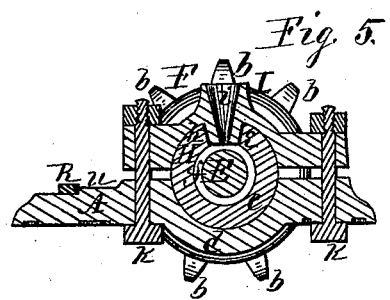

Figure 1 is a plan view of a metallic gear-bed with a gear-train mounted therein representing my improvements, of which Fig. 2 is a side elevation, looking against the face side of the large bevel-toothed wheel. Fig. 3 is a lengthwise vertical section on dotted line $x$. Fig. 4 is a transverse vertical section on dotted line $y$, and Fig. 5 is a transverse vertical section on dotted line $z$.

In the several figures, A represents a metallic bed-frame, which may be of any suitable form, or of the form represented, which is designed to be mounted on the bed-frame of a harvester, to which it may be fixed in place by means of the same bolts that fix the bearings in place on the bed-frame, or it may be fixed thereto by any other suitable known means.

B represents a transverse shaft, on which is mounted a toothed gear-pinion, C, designed to engage the teeth of a master gear-wheel, which may be of any of the usual or known forms employed in the manufacture of harvesting-machines. It is also provided with the beveled toothed gear-wheel D, fixed in place thereon.

E represents a lengthwise shaft, on which is fixed the crank-head F, fitted with a wrist-pin, $a$, to receive the pitman to connect with the cutters of a harvester, to impart motion thereto in the usual manner.

The periphery of the crank-head is fitted with sprocket-teeth $b$ to engage the links of a chain-belt, which may be employed to impart motion to the carriers, elevators, or other moving parts of a harvester or binding-machine. This shaft E is also provided with a beveled toothed gear-pinion, G, mounted loosely thereon in such position that its teeth will engage the teeth of the beveled-tooth wheel D. These shafts B and E, at proper points, are fitted with thimble-bearings H, bored to receive their shafts to revolve therein in a proper manner. These thimble-bearings are fitted with spherical enlargements at proper points, as at $c$, to engage suitable depressions $d$, formed in the bed-frame for their reception. These thimble-bearings are provided with openings $e$ on the upper side of the spherical enlargement, which opening connects with an annular oil-chamber, $f$, formed in the spherical enlargement of the thimbles.

I are caps formed to embrace the spherical enlargement of the thimble-bearings, and are provided with a depending nipple. These caps are formed with oils-cups $i$, which open through the nipple into the annular oil-chamber $f$, and are also formed with arms to overlap the bed-frame and receive the screw-bolts $k$, which pass through the bed-frame and cap and operate to hold the parts in place, clamping the thimble-bearings between the cap and bed-frame in such a manner as to permit them to adjust themselves in line to permit the shafts to revolve therein without cramping, and the nipples of the caps, entering the openings in the thimbles, prevent them from turning in their bearings, and also serve to conduct the oil into the annular chamber around the shaft.

The lengthwise shaft E is fitted with a collar, $l$, to prevent it moving endwise. The outer end of the hub of the beveled toothed gear-pinion is fitted in clutch form to engage the clutch L, which is mounted on the same shaft, and is made to revolve therewith by means of the pins $o$, which are passed through the shaft, and their projecting ends enter grooved ways formed in the inner side of the clutch, which groove permits the clutch to slide endwise on the shaft, and its connection with the pins compels it to rotate therewith.

P represents a coiled spring wound on the shaft between the collar $l$ and the clutch L, the action of which tends to hold the clutch engaged with the beveled toothed pinion to impart motion to the crank-head mounted on the shaft.

R represents a bell-crank shipping-lever pivoted to the main frame at $p$, and it engages the clutch L by means of its forked arms $s$ entering the annular groove $t$, and by means of the free end of the bell-crank lever R, moved into the position of the dotted lines to engage the stop $u$, the clutch will be disengaged, moved, and held in the position of the dotted lines, and permit the bevel-toothed gear-pinion to revolve without imparting motion to the shaft or crank-head mounted thereon. If the handle-arm of the shipping-lever is disengaged from the stop $u$, the action of the coiled spring will force the clutch to engage the clutched formed hub of the beveled toothed pinion to impart motion to the shaft and the crank-head mounted thereon.

In this example I have represented a metallic bed-frame formed in one piece, adapted to be fixed to a wood or metallic gear-frame as a convenient method of employing my improvement; but it can be employed in wood or metallic gear-frames without the metallic bed herein described and shown, and when employed in a wood gear-frame those portions of the frame represented as clamping the thimble-bearings may be made in separate parts and independently bolted to the frame; or if an entire metallic frame is employed, then one part of the clamping portions may be formed in the frame, substantially as represented in the example herein shown and described.

I have represented my improvement in connection with a harvester, to which purpose it is peculiarly adapted, as it is evident from the foregoing description that it will adapt itself to the warping, twisting, and springing of the frame, and under all such or similar circumstances the shafts will be properly in line in the thimble-bearings to revolve therein freely, but do not desire to limit its use to harvesters, as it is capable of use in other machines and still retain the features of my invention.

By the employment of my improvement the gearing is more readily adjusted, as it only requires the parts to be put in place and firmly bolted, by which I dispense with the usual packing and the labor required to properly adjust and line the parts.

I claim as my invention—

1. The combination, with a thimble-bearing provided with a spherical enlargement that encircles the thimble, and having an annular oil-chamber having an oil-duct connecting therewith, of a clamping-cap provided with a perforated nipple adapted to be inserted in the oil-duct in the thimble-bearing, substantially as set forth.

2. The herein-described thimble-bearings, having a spherical enlargement adapted to permit of lengthwise alignment and prevent endwise movement, and having an oil-duct communicating with its journal-bearing surface, and a cap provided with a perforated nipple adapted to be inserted in the oil-duct in the thimble-bearing, in combination with a metallic bed-frame of a harvester, formed in one piece, suitably recessed to receive the thimble-bearing, to support in proper position the shafts of the gear-train of a harvester, substantially as hereinbefore set forth.

THEODORE M. FLENNIKEN.

Witnesses:
H. B. ULTER,
A. O. BEHEL.